(12) United States Patent
Cho

(10) Patent No.: US 8,058,589 B2
(45) Date of Patent: Nov. 15, 2011

(54) ELECTRIC RANGE

(75) Inventor: Jeong Hyun Cho, Changwon-si (KR)

(73) Assignee: LG Electronics Inc., Seoul (KR)

( * ) Notice: Subject to any disclaimer, the term of this patent is extended or adjusted under 35 U.S.C. 154(b) by 807 days.

(21) Appl. No.: 11/914,863

(22) PCT Filed: Dec. 22, 2005

(86) PCT No.: PCT/KR2005/004453
§ 371 (c)(1),
(2), (4) Date: Jun. 30, 2008

(87) PCT Pub. No.: WO2006/123855
PCT Pub. Date: Nov. 23, 2006

(65) Prior Publication Data
US 2008/0302782 A1    Dec. 11, 2008

(30) Foreign Application Priority Data
May 20, 2005  (KR) .................. 10-2005-0042487

(51) Int. Cl.
*H05B 3/68* (2006.01)
*H05B 6/42* (2006.01)
(52) U.S. Cl. ............... 219/448.17; 219/448.11; 219/627
(58) Field of Classification Search .................. 219/601, 219/620, 624, 627, 443.1, 446.1, 448.11, 219/448.17, 465.1
See application file for complete search history.

(56) References Cited

U.S. PATENT DOCUMENTS

| 3,191,003 | A | * | 6/1965 | Yohe ................. 219/448.14 |
| 3,786,220 | A | * | 1/1974 | Harnden, Jr. ............. 219/622 |
| 4,045,654 | A | * | 8/1977 | Eide .................. 219/448.17 |
| 4,351,996 | A |   | 9/1982 | Kondo et al. |
| 5,448,038 | A | * | 9/1995 | Kim .................... 219/627 |
| 2004/0245244 | A1 | * | 12/2004 | Hirota et al. ............... 219/624 |

FOREIGN PATENT DOCUMENTS
DE       19604436       8/1997
* cited by examiner

*Primary Examiner* — Sang Paik
(74) *Attorney, Agent, or Firm* — KED & Associates LLP

(57) ABSTRACT

The present invention relates to an electric range comprising a body (100) for defining an exterior, an upper plate (400) on a top of the body (100), a working coil (210) provided in the body (100) for generating an electromagnetic force, an upper insulating sheet (240) provided to cover an upper surface of the working coil (210), a temperature sensor (250) secured to the electric part of the upper insulating sheet (240) for sensing a temperature of the upper plate (400) in a close contact with a downside of the upper plate (400), and an elastic part elastically formed in the upper insulating sheet (240) for making the temperature sensor (250) in a close contact with the upper plate (400).

20 Claims, 6 Drawing Sheets

[Fig. 1]
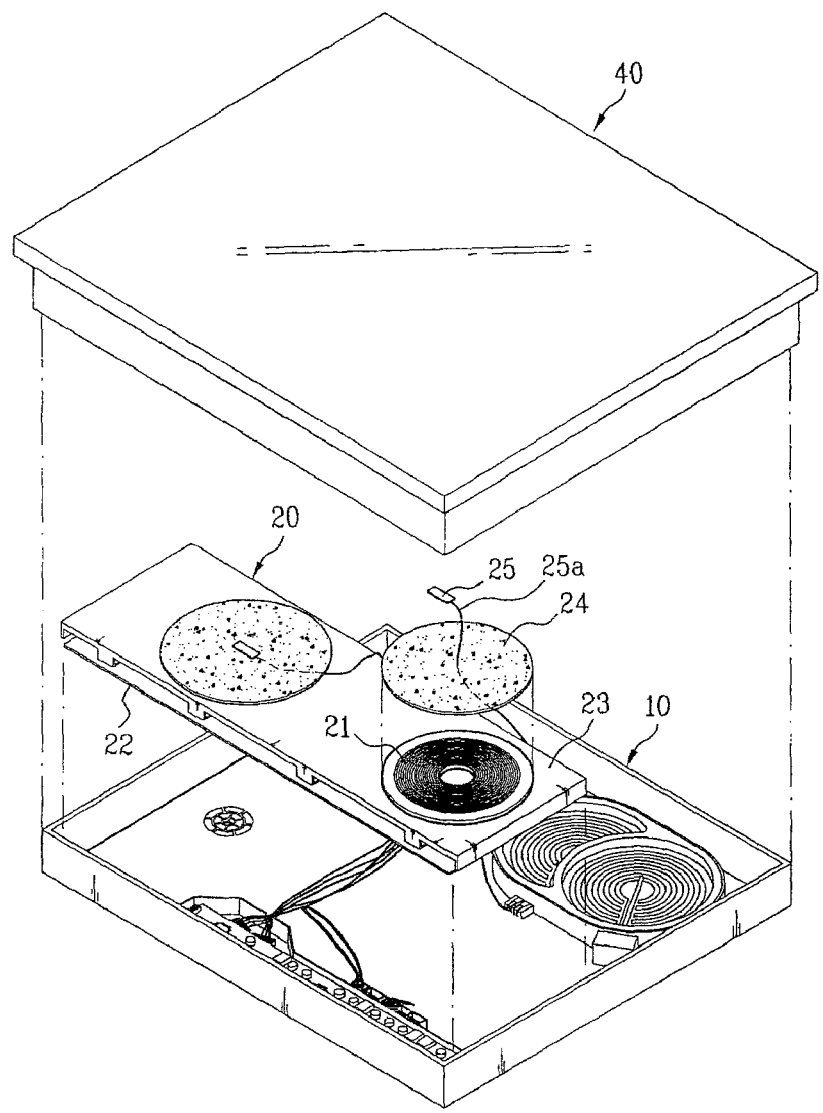
[Fig. 2]
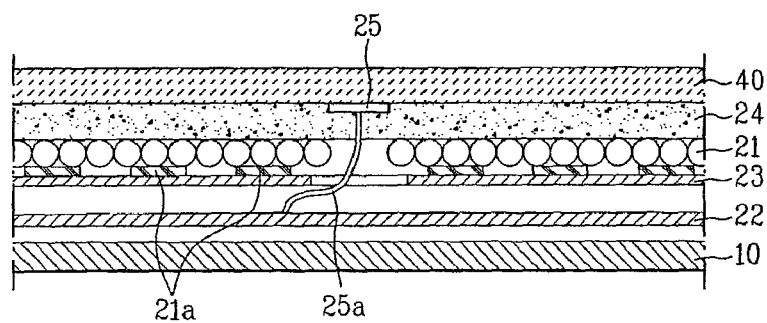

[Fig. 3]
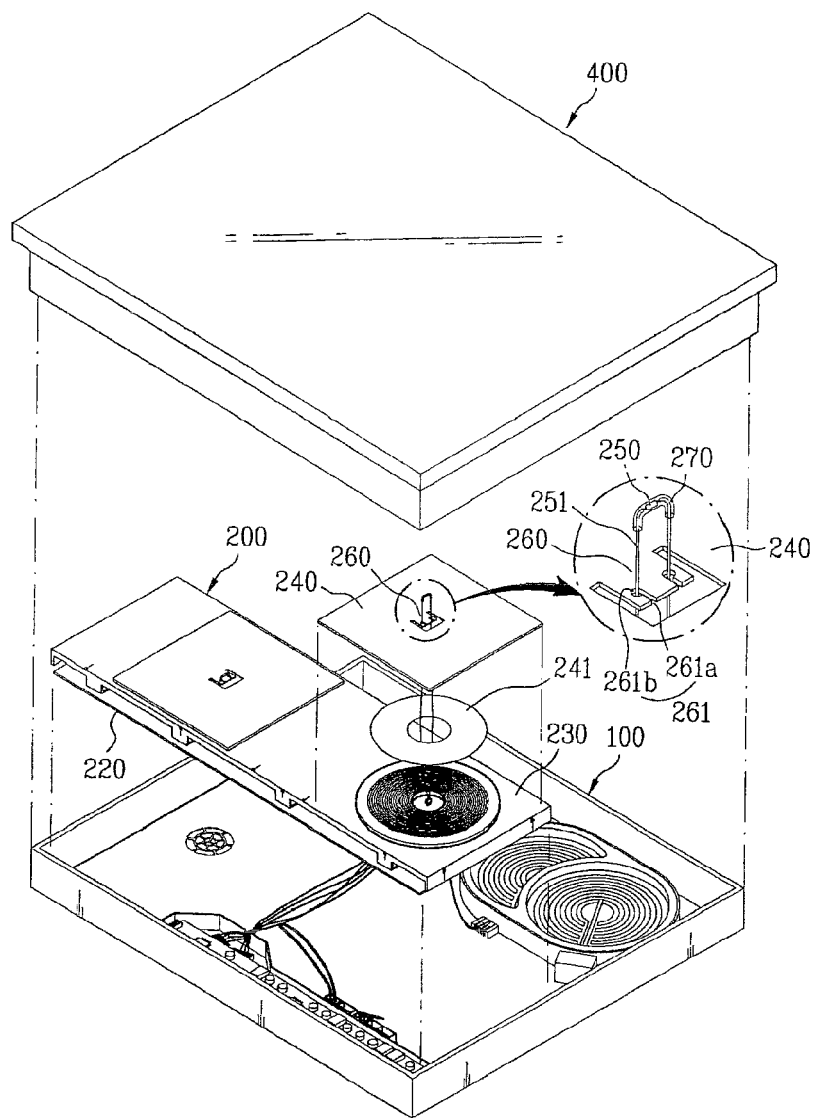
[Fig. 4]
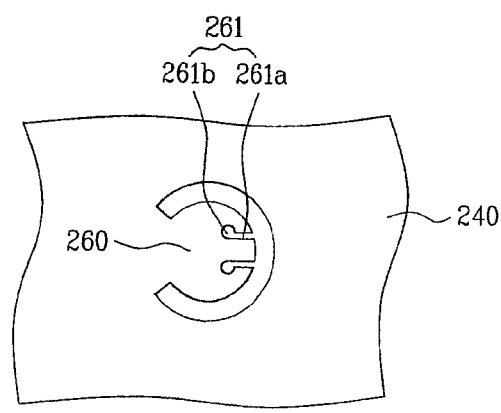

[Fig. 5]
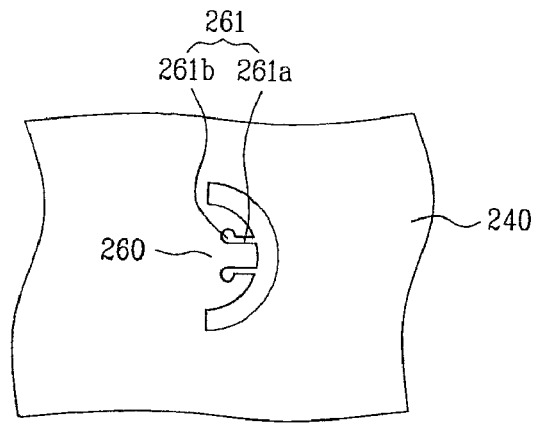
[Fig. 6]
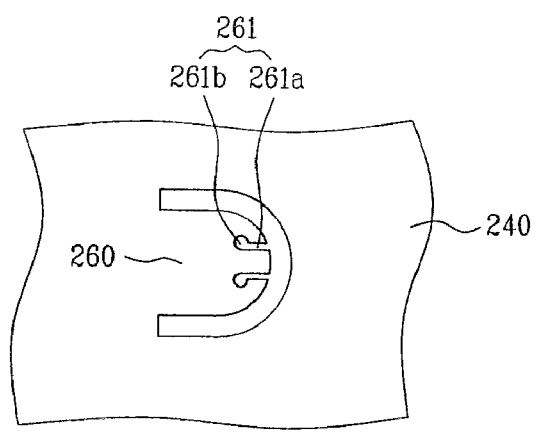
[Fig. 7]
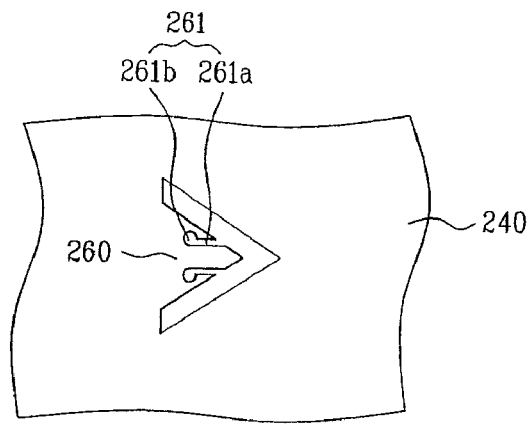

[Fig. 8]
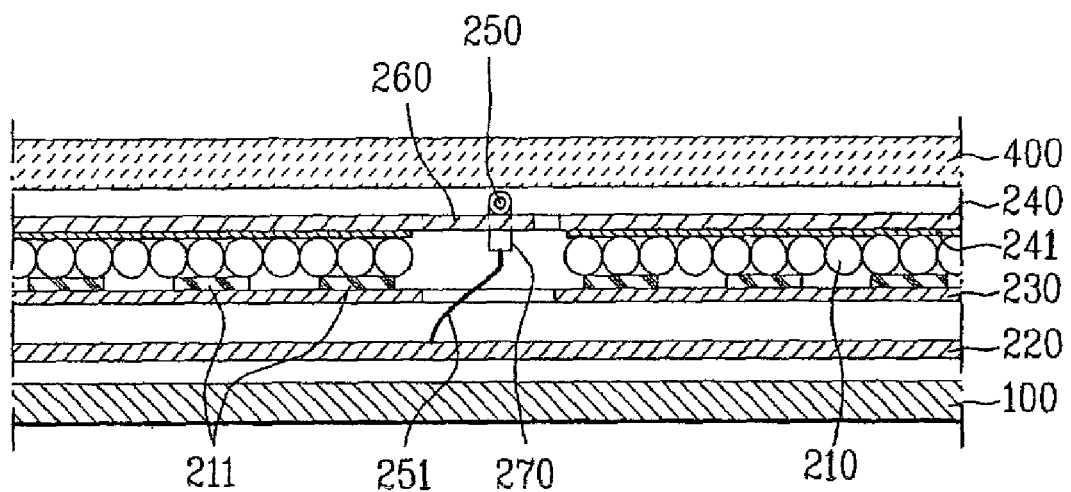
[Fig. 9]
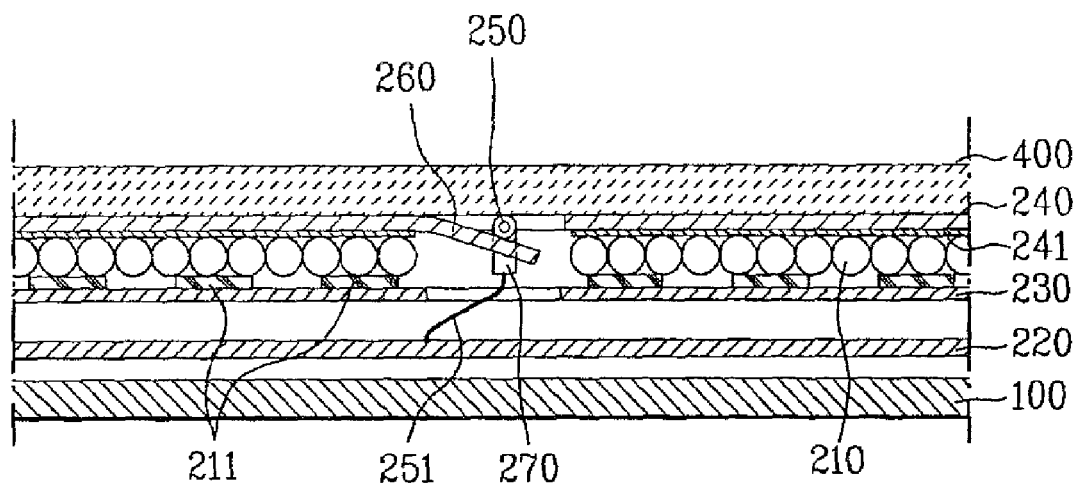

[Fig. 10]
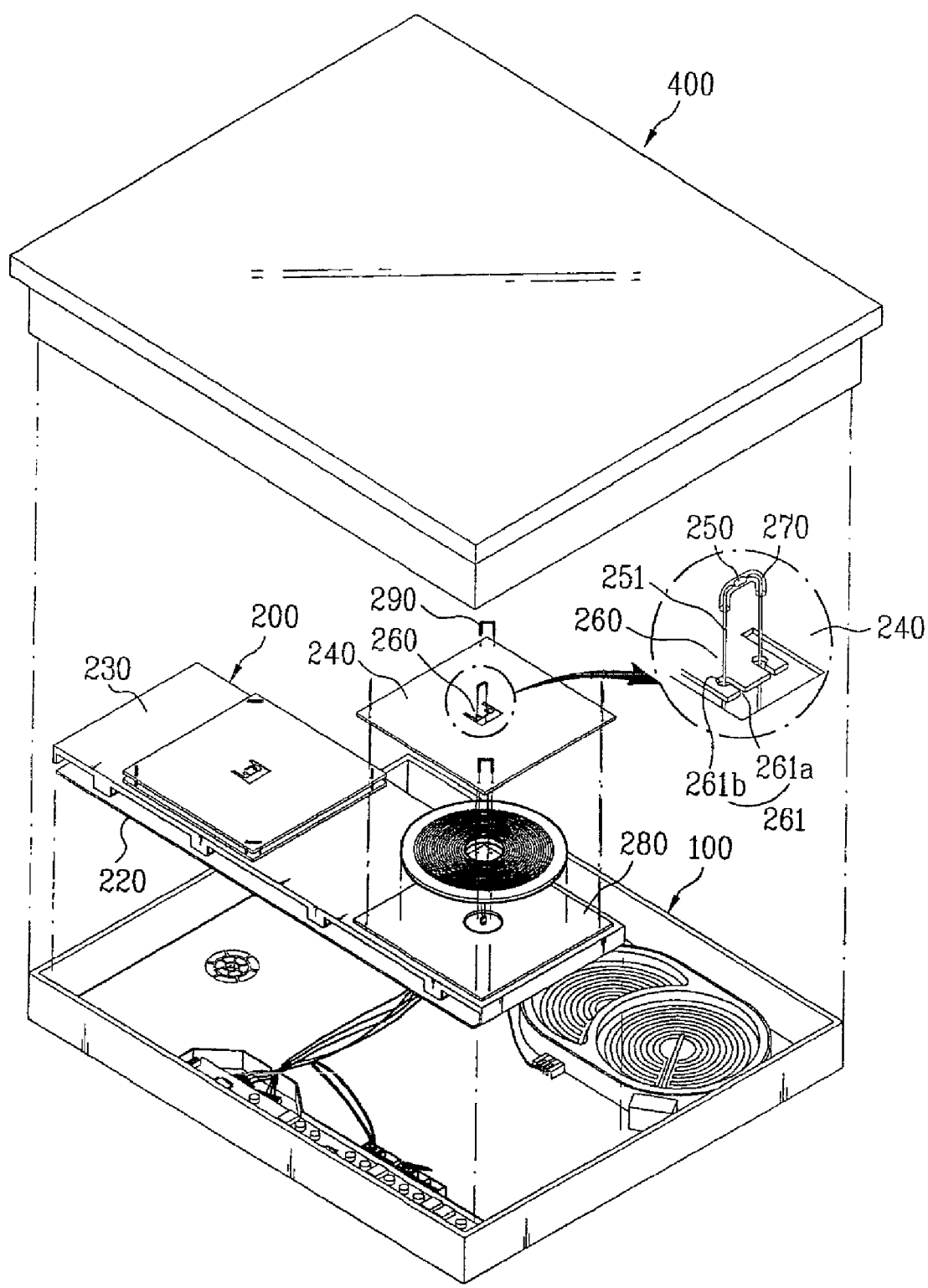

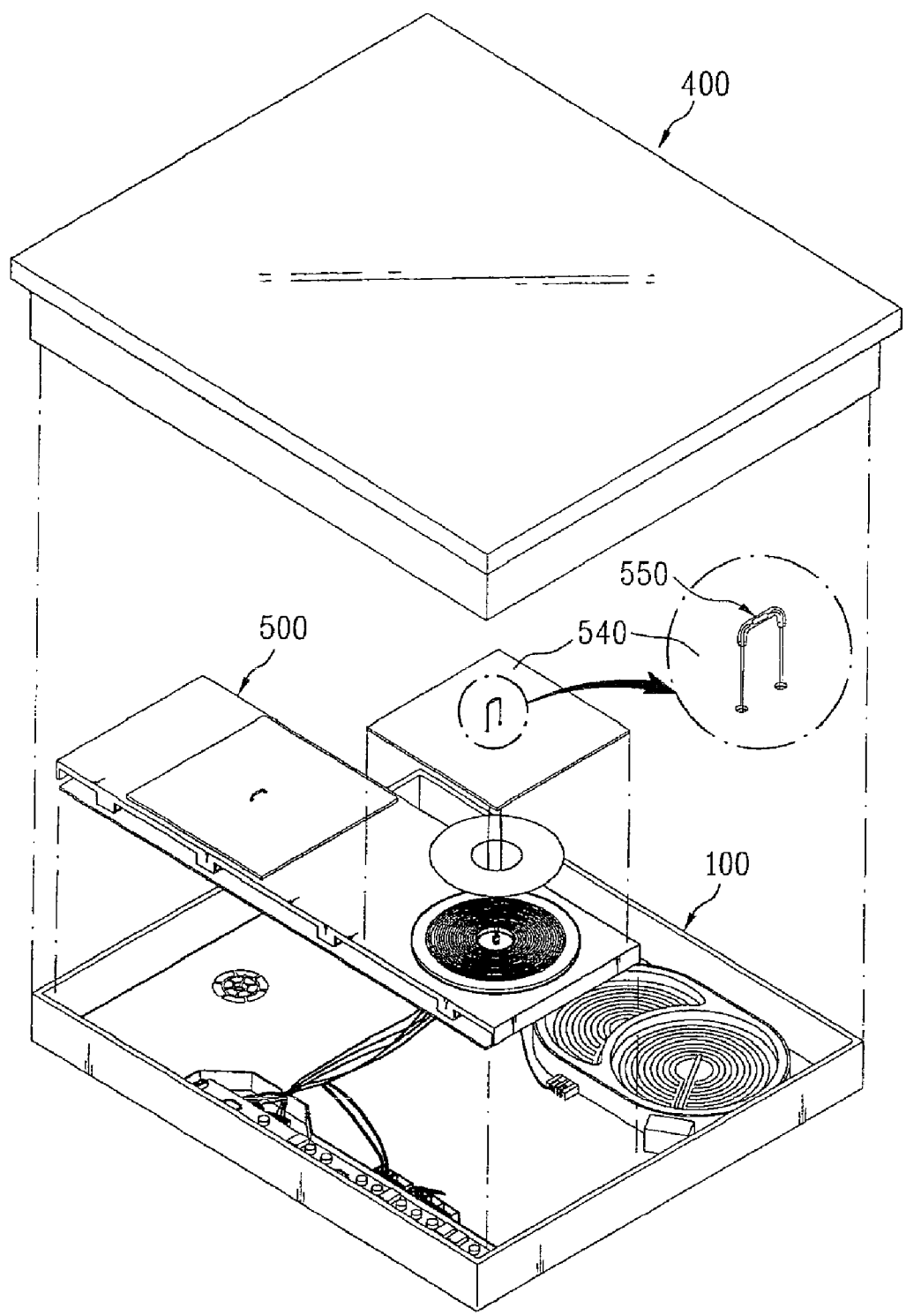
[Fig. 11]

ELECTRIC RANGE

TECHNICAL FIELD

The present invention relates to electric ranges, and more particularly, to a new type of an electric range which is capable of sensing a heating temperature precisely, as well as is adapted to sense it in a simple structure.

BACKGROUND ART

Generally, electric rangers are cooking devices which cook by using an electric heater or a heating element as a heating source.

FIG. 1 and FIG. 2 illustrate a structure of a conventional electric range. Referring to them, the structure of the conventional electric range will be described.

In FIG. 1, the conventional electric range comprises a body 10 for forming an exterior, one or more heater assemblies 20 for generating a heating source, a power supply part (not shown) for supplying power to each heater assembly 20, a control assembly 30 for controlling an entire operation of the electric range, and an upper plate 40 defining a top of the electric range for having a food container thereon.

The heater assembly 20 mounted in the body 10 is of an induction heating structure in which a food container itself generates heat once applying an electromagnetic force to the container in an induction heating way.

The heater assembly 20 comprises a working coil 21, a circuit board 22, a heater base 23, and an insulating sheet 24.

The working coil 21 is employed for transmitting the electromagnetic force to the food container, and the circuit board 22 is for controlling an induction current supplied to the working coil 21.

The heater base 23 is provided between the working coil 21 and the circuit board 22 for forming a body of the heater assembly 20.

Between the heater base 23 and the working coil 21 is provided a magnet 21a for preventing a magnetic field (not shown) formed by the working coil 21 in a downside of the working coil 21.

Furthermore, the insulating sheet 24 of asbestos material is provided to cover a top of the working coil 21.

The insulating sheet 24 is employed for preventing the heat radiated from the upper plate 40 from being transmitted to the working coil 21.

Still further, a temperature sensor 25 is mounted on the insulating sheet 24 for sensing a cooking temperature heated by the working coil 21.

A wire 25a passes through a downside of the insulating sheet 24 to be drawn outside for applying power to the temperature sensor 25.

Thus, after driving the electric range, power is applied to the working coil 21 of the heater assembly 20. Hence, the induction current is generated, after that the food container is heated and cooking is performed.

However, as described hereinabove, the heater assembly 20 of the conventional electric rage has the following problems.

First, since it is mounted on the top of the insulating sheet 24 without any additional supporting structure or securing structure, the temperature sensor 25 of the heater assembly 20 may be going out of its position in a process of placing the upper plate 40.

Second, preferably the temperature sensor 25 may be in a close contact with a downside of the upper plate 40 for a high sensing efficiency. Commonly, considering that the insulating sheet 24 is made of asbestos material with good thermo stability, the temperature sensor 25 may be embedded in the insulating sheet 24. Therefore, it may cause a problem that the close contact between the temperature sensor 25 and the upper plate 40 may not be made smoothly, thereby deteriorating a reliability of the sensed temperature.

Third, since it, as described above, is made of the asbestos material, the insulating sheet 24 may cause problems of a high production cost as well as of the bad influence on the workers health.

Accordingly, the above problems necessitate a replacement of the asbestos.

DISCLOSURE OF INVENTION

Technical Problem

An object of the present invention devised to solve the problem is to provide a new type of an electric rage which is capable of sensing a heating temperature precisely, as well as is adapted to sense it in a simple structure.

Technical Solution

To achieve this object and other advantages and in accordance with the purpose of the invention, as embodied and broadly described therein, an electric range according to an embodiment of the present invention comprises a body for forming an exterior; an upper plate placed on a top of the body; a working coil provided in the body for generating an electromagnetic force; an upper insulating sheet provided for covering an upper surface of the working coil; a temperature sensor secured to the elastic part of the upper insulating sheet for sensing a temperature of the upper plate in a close contact with a downside of the upper plate; and an elastic part elastically formed in the upper insulating sheet for making the temperature sensor in a close contact with the upper plate.

In another aspect of the present invention an electric range comprises a body for forming an exterior; an upper plate placed on a top of the body; a working coil provided in the body for generating an electromagnetic force; an upper insulating sheet made of a mica sheet for covering an upper surface of the working coil; and a temperature sensor secured in the upper insulating sheet for sensing a temperature of the upper plate in a close contact with a downside of the upper plate, wherein a wire connected with both ends thereof are bent downwardly to pass through the upper insulating sheet then to be drawn into a downside of the insulating sheet.

Advantageous Effects

An electric range according to each embodiment of the present invention has an advantageous effect that the production cost may be reduced, because it makes the insulating sheet of a mica sheet for preventing the heat reversely induced from the upper plate toward the working coil.

The electric range according to a first embodiment of the present invention has another advantageous effect that the reliability of the temperature sensing value may be enhanced, because it forms an elastic part on the insulating sheet having the temperature sensor mounted thereon to make the close contact more precisely between the temperature sensor and the upper plate.

Still further, the electric range according to each embodiment of the present invention has a third advantageous effect that the above reliability may be enhanced, because the temperature sensor maintains a state of being fixedly secured to the insulating sheet in order to prevent the position of the temperature sensor from being varied in a process of placing the upper plate in the body.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a schematic cut-away, perspective view of a conventional electric range.

FIG. 2 is a sectional view of key parts illustrating an installment structure of a heater assembly in accordance with the conventional electric range.

FIG. 3 is a cut-away, perspective view of schematically illustrating an electric range in accordance with a first embodiment of the present invention.

FIGS. 4 to 7 are plan views each illustrating an example in accordance with an appearance of an elastic part in the electric range of the first embodiment of the present invention.

FIGS. 8 and 9 are sectional views of key parts each illustrating an installed state of a heater assembly of the electric range in accordance with the first embodiment of the present invention.

FIG. 10 is a schematic cut-away, perspective view of an electric range in accordance with a second embodiment of the present invention.

FIG. 11 is a schematic cut-away, perspective view of an electric range in accordance with a third embodiment of the present invention.

BEST MODE FOR CARRYING OUT THE INVENTION

Reference will now be made in detail to the preferred embodiments of the present invention, examples of which are illustrated in the accompanying drawings.

In FIG. 3, the electric range in accordance with the first embodiment of the present invention is illustrated.

That is, the electric range in accordance with the first embodiment of the present invention comprises a body 100, an upper plate 400, at least one heater assembly 200.

The body 100 having a predetermined space for installment forms an exterior of the electric range.

The body 100 may be formed in a four-cornered box shape having an opened top.

The upper plate 400 is secured to the opened top of the body 100 for making inside space shut out.

The upper plate 400 is made of ceramic glass in a plate shape for having cooking objects or various kinds of food containers (not shown) thereon.

As described before, it is embodied that the structures of the body 100 and the upper plate 400 according to the present invention are the same as those of the body 10 and the upper plate 40 according to the related art electric range. Of course, the structures of the body 100 and the upper plate 400 may be varied.

A heater assembly 200 according to the first embodiment of the present invention comprises a working coil 210, a circuit board 220, a heater base 230, an upper insulating sheet 240, and a temperature sensor 250.

The working coil 210 provided in the body 100 generates an electromagnetic force. The electromagnetic force is transmitted to the food container on an upper surface of the upper plate 400.

Also, the circuit board 220 provided in a downside of the working coil 210 controls the working coil 210 so that the working coil 210 may supply an induction current to the food container.

The heater base 230 is fixedly secured in the body 100, having a downside thereof secured to the circuit board 220 and an upside thereof secured to the working coil 210 to stop the induction current from going downwardly.

Furthermore, a plurality of magnets 211 is provided along the working coil 210 in a radial shape between an upper surface of the heater base 230 and the working coil 210.

Each magnet 211 prevents the electromagnetic force generated in the working coil 210 from being induced downwardly, in other words, toward the circuit board 220.

The upper insulating sheet 240 is formed to cover an upper surface of the working coil 210 for stop the heat radiated from the upper plate 400 from being directly supplied to the working coil 210.

More specifically, the upper insulating sheet 240 has an opening approximately in a center thereof. An elastic part 260 is formed in the opening as a single piece for being elasticated upward/downward.

A first end of the elastic part 260 is connected to the upper insulating sheet 240 and a second end thereof is projected toward an inside of the opening. Thus, it is possible that the second end of the elastic part 260 is elasticated upwardly/downwardly with respect to the first end thereof in the opening. In the embodiments of the present invention, the elastic part 260 is a four-cornered shape as seen in a plan view to facilitate elastic adjustment of the elastic part 260.

The elasticity adjustment of the elastic part 260 is possible due to the length change of the 3 sides of the elastic part 260.

It is embodied in the present invention that the length of each 3 side is approximately same.

As shown in FIGS. 4 through 6, the second end of the elastic part 260 may be a round shape such as a circle, a semicircle or an oval, and as shown in FIG. 7 it may be a triangle. Although not shown, it also may be a polygonal shape.

Still further, it is preferred that the upper insulating sheet 240 is a mica sheet, because the conventional insulating sheet 24 made of asbestos may not be hard enough to have elasticity.

Furthermore, in case of the upper insulating sheet 240 of a mica sheet, the insulating effect may be obtained as same as the effect in case of the upper insulating sheet 24 of asbestos. On the other hand, the price of the former is relatively lower than the price of the latter.

The temperature sensor 250 is secured to an upper surface of the elastic part 260 in a close contact with a downside of the upper plate 400 for sensing a temperature of the upper plate 400.

Once it is contacted with the upper plate in a process of placing the upper plate in the body 100, the temperature sensor 250 is pulled toward any one direction. As a result, the final placed position may be varied. Also, since the connection portion between both ends of the temperature sensor 250 and a wire 251 is fragile, a simple connection between the temperature sensor 250 and the elastic part 260 may cause a problem of breaking the above connection portion.

Therefore, a support tube 270 is further provided for maintaining a stable installment between the temperature sensor 250 and the elastic part 260. In the elastic part 260 a pair of grooves is formed so that the both ends of the support tube are insertedly secured.

The support tube 270 is formed to cover the temperature sensor 250, and the both ends thereof are bent downwardly with respect to the temperature sensor 250, after that, preferably each being installed in each groove 261 in the elastic part 260.

Of course, the support tube 270 may be made of material capable of enduring a high temperature as well as insulating heat smoothly.

It is preferred that the support tube 270 is formed to cover the connection portion between the temperature sensor 250 and the wire 251 as well as the temperature sensor 250 for protecting them from outside environment.

An inlet portion 261a of the groove 261 is smaller in diameter than the support tube 270, and an inside portion thereof is the same or larger in diameter as/than the support tube 270. Therefore, securing the support tube 270 may be facilitated but breakage may be prevented.

An assembly process of the electric range according to the embodiments of the present invention will be described in detail.

First of all, the temperature sensor 250 covered with the support tube 270 is secured to the elastic part 260.

Both ends of the support tube 270 are insertedly secured in the pair of grooves 261 on the elastic part 260.

At this time, the upper insulating sheet 240 is placed on an upper surface of the working coil 210.

The upper insulating sheet 240 is bonded to the upper surface of the working coil 210 with an adhesive such as double-stick tape.

Of course, the upper insulating sheet 240 is fastened to the working coil 210 with a screw, a hook, or a wire. Also, the upper insulating sheet 240 is directly fastened to the heater base 230.

The circuit board 220 is placed on a downside of the heater base 230, and the working coil 210 is in a state of being connected with the circuit board 220 electrically.

In the body 100 is installed the heater base 230 connected with the working coil 210, the upper insulating sheet 240 and the circuit board 220.

Hence, after completing the process described above, an upper plate 400 is placed in an upper portion of the body 100.

In that case, a downside of the upper plate 400, as shown in FIG. 8, is contacting the upper insulating sheet 240 gradually and the temperature sensor 250 on the elastic part 260 is also contacting the downside of the upper plate 400.

Considering the temperature sensor 250 is relatively projected compared with the upper surface of the insulating sheet 240, the temperature sensor 250 is provided with force pressed downwardly from the upper plate 400 in case that the upper plate 400 is getting placed onto the body 100.

However, the position variation of the temperature sensor 250 is not made in spite of the contact between the temperature sensor 250 and the upper plate 400, because the temperature sensor 250 maintains a state of being secured on the elastic part 260 by the support tube 240.

Also, when the temperature sensor 250 is provided with force pressed from the upper plate 400, the elastic part 260 having the temperature sensor 250 thereon is pressed downwardly, thereby getting bent.

Therefore, once the upper plate 400 is placed on the body 100, the elastic part 260 maintains the state of being bent downwardly by means of the close contact between the temperature sensor 250 and the upper plate 400.

Thus, as shown in FIG. 9 the temperature sensor 250 may maintain a close contact with the downside of the upper plate 400, because the elastic part 260 supplies force of upward restitution to the temperature sensor 250.

Accordingly, sensing a precise temperature of the temperature sensor 250 may be possible due to the above-described configurations.

The structure of the electric range according to the present invention is not limited to that of the electric range according to the first embodiment.

FIG. 10 illustrates an inside structure of an electric range according to a second embodiment of the present invention.

That is, the electric range of the second embodiment of the present invention further comprises a lower insulating sheet 280 for covering a lower surface of the working coil 210, compared with that of the first embodiment of the present invention.

The lower insulating sheet 280 of a mica sheet just like the upper insulating sheet 240 prevents heat around the working coil 210 from being induced to the heater base 230.

The lower insulating sheet 280 may be bonded to a downside of the working coil 210 by means of adhesives such as double-stick. A problem of high production cost may arise, because the above double-stick should be an expensive one capable of being used in a high-temperature environment.

Therefore, in the second embodiment of the present invention, preferably the lower insulating sheet 280 is secured to the upper insulating sheet 240 by a separate fastening member 290.

The fastening member 290 may be one of a wire, a screw, and a hook, and in the second embodiment of the present invention the fastening member 290 is a wire.

The area of the lower insulating sheet 280 and the upper insulating sheet 240 may be larger than the working coil 210 for securing a fastening portion of the fastening member 290.

That is, an outer portion of the working coil 210 not corresponding thereto, out of periphery of each insulating sheet 240, 280, is fastened with the fastening member 290, thereby fixedly securing the insulating sheets 240, 280.

On the other hand, in FIG. 11 an electric range according to a third embodiment of the present invention is illustrated. Configurations of a body 100 and an upper plate 400 of the above electric range are the same as those of the body 100 and the upper plate 400 described in the first and second embodiment.

In the electric range according to the third embodiment of the present invention, a heater assembly 500 may enhance accuracy of sensing a temperature in a way that the contact between a temperature sensor 550 and an upper plate 400 is closer than a conventional contact between them in the related art without an elastic part on an upper insulating sheet 540.

The temperature sensor 550 is provided on an upper surface of the upper insulating sheet 540 s center where the elastic part 540 is not formed. A wire connected in both ends of the temperature sensor 550 is bent downwardly and passes through the upper insulating sheet 540. After that, it is drawn into a downside of the upper insulating sheet 540.

In other words, since it is made of a thin mica sheet, the upper insulating sheet 540 itself has a predetermined elasticity. Thereby, the temperature sensor 550 and the upper plate may be in a close contact by the elasticity of the upper insulating sheet 540 even though the upper plate 400 presses the temperature sensor 550 during the process of placing the upper plate 400 on the body 100.

Based on the above detailed description, the electric range according to the present invention is a useful device which can be adapted in various ways.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The electric range according to each embodiment of the present invention may have an industrial applicability, because it may sense a temperature of the upper plate where a food container is put thereon more accurately.

The invention claimed is:

1. An electric range comprising:
a body for defining an exterior;
an upper plate placed on a top of the body;
a working coil provided in the body for generating an electromagnetic force;
an upper insulating sheet provided to cover an upper surface of the working coil;
a temperature sensor secured to the elastic part of the upper insulating sheet for sensing a temperature of the upper plate in a close contact with a downside of the upper plate; and
an elastic part elastically formed in the upper insulating sheet for making the temperature sensor in a close contact with the upper plate.

2. The electric range as claimed in claim 1, wherein the upper insulating sheet is made of a mica sheet.

3. The electric range as claimed in claim 1, wherein the elastic part having the temperature sensor is formed in a center of the upper insulating sheet.

4. The electric range as claimed in claim 3, wherein an opening is formed in the center of the upper insulating sheet, and a first end of the elastic part is connected to the upper insulating sheet and a second end thereof is projected toward an inside of the opening.

5. The electric range as claimed in claim 4, wherein the second end of the elastic part is a round shape such as a circle, a semicircle or an oval.

6. The electric range as claimed in claim 4, wherein the second end of the elastic part is a polygon shape.

7. The electric range as claimed in claim 3, further comprising: a support tube for covering the periphery of the temperature sensor, wherein both ends of the support tube is bent downwardly with respect to the temperature sensor and secured in the elastic part.

8. The electric range as claimed in claim 7, wherein a pair of grooves is formed each in the elastic part so that both ends of the support tube may be insertedly secured.

9. The electric range as claimed in claim 8, wherein an inlet portion of the groove is smaller in diameter than the support tube, and an inside portion thereof is approximately the same or larger in diameter as or than the support tube.

10. The electric range as claimed in claim 1, further comprising:
a support tube fear covering the temperature sensor, wherein both ends of the support tube is bent downwardly with respect to the temperature sensor and secured in the elastic part on the upper insulating sheet.

11. The electric range as claimed in claim 10, wherein a pair of grooves is formed each in the elastic part so that both ends of the support tube may be insertedly secured.

12. The electric range as claimed in claim 11, wherein an inlet portion of the groove is smaller in diameter than the support tube; and an inside portion thereof is approximately the same or larger in diameter as or than the support tube.

13. The electric range as claimed in claim 1, further comprising a lower insulating sheet for covering a downside of the working coil.

14. The electric range as claimed in claim 13, wherein the lower insulating sheet is made of a mica sheet.

15. The electric range as claimed in claim 13, wherein the area of the upper insulating sheet and the lower insulating sheet is lager than that of the working coil.

16. The electric range as claimed in claim 15, further comprising at least one fastening member provided in the periphery of the upper and lower insulating sheets for fastening the upper insulating sheet and the lower insulating sheet.

17. The electric range as claimed in claim 15, wherein the fastening member is at least anyone of adhesives, wires, and screws.

18. An electric range comprising:
a body for forming an exterior;
an upper plate placed on a top of the body;
a working coil provided in the body for generating an electromagnetic force;
an upper insulating sheet made of a mica sheet for covering an upper surface of the working coil; and
a temperature sensor secured in the upper insulating sheet for sensing a temperature of the upper plate in a close contact with a downside of the upper plate, wherein a wire connected with both ends thereof are bent downwardly to pass through the upper insulating sheet and to be drawn into a downside of the insulating sheet.

19. The electric range as claimed in claim 18, wherein the temperature sensor is in a center of the upper insulating sheet.

20. The electric range as claimed in claim 18, further comprising a support tube for covering the periphery of the temperature sensor, wherein both ends of the support tube are bent downwardly with respect to the temperature sensor, and secured in the upper insulating sheet after passing through the upper insulating sheet.

* * * * *